United States Patent [19]

Ona et al.

[11] 4,359,545

[45] Nov. 16, 1982

[54] FIBER-TREATING COMPOSITIONS COMPRISING TWO ORGANO-FUNCTIONAL POLYSILOXANES

[75] Inventors: Isao Ona, Sodegaura; Masaru Ozaki; Yoichiro Taki, both of Ichihara, all of Japan

[73] Assignee: Toray Silicone Co., Ltd., Tokyo, Japan

[21] Appl. No.: 345,298

[22] Filed: Feb. 3, 1982

[30] Foreign Application Priority Data

Feb. 5, 1981 [JP] Japan ................................. 56-16200

[51] Int. Cl.³ ..................... C08L 83/04; C08L 83/06; C08K 5/01; D06M 15/66
[52] U.S. Cl. .................................... 524/262; 524/265; 524/266; 524/267; 524/588; 524/731; 524/315; 524/361; 524/364; 252/8.8
[58] Field of Search ................. 252/8.8; 524/262, 265, 524/266, 267, 588, 731, 315, 361, 364

[56] References Cited

U.S. PATENT DOCUMENTS

| | | |
|---|---|---|
| 2,970,150 | 1/1961 | Bailey ................................... 252/8.8 |
| 3,700,713 | 10/1972 | Atherton et al. .................... 252/8.8 |
| 3,717,575 | 2/1973 | Rankin ................................. 252/8.8 |
| 4,311,626 | 1/1982 | Ona et al. ............................. 252/8.8 |
| 4,311,737 | 1/1982 | Ishizaka et al. ...................... 252/8.8 |

*Primary Examiner*—Maria Parrish Tungol
*Attorney, Agent, or Firm*—George A. Grindahl

[57] ABSTRACT

Fiber-treating compositions are disclosed which contain two types of organofunctional polysiloxanes, one bearing amino-functional organic groups and polyoxyalkylene groups and the other bearing either carboxyfunctional organic groups or epoxy-functional groups, in addition to polyoxyalkylene groups.

These compositions are useful for durably treating fibers to provide several benefits such as antistatic character, moisture/perspiration absorbability, stain resistance, pliability, smoothness, crease resistance and compression recovery.

5 Claims, No Drawings

FIBER-TREATING COMPOSITIONS COMPRISING TWO ORGANO-FUNCTIONAL POLYSILOXANES

BACKGROUND OF THE INVENTION

This invention is concerned with fiber treatment agents. More specifically, it is concerned with fiber treatment agents for giving fiber materials long-lasting electrostatic prevention characteristics, moisture absorbence, perspiration absorbence, antisoiling characteristics, softness, smoothness, antiwrinkling characteristics, compression recovery characteristics, and so on.

Conventionally, various treating agents have been provided or proposed. These treating agents contain organopolysiloxanes or their derivatives to provide fiber materials with softness, smoothness, antiwrinkling characteristics, recovery characteristics, and so on.

For example, current methods employ treating agents containing dimethyl polysiloxane oil, or emulsions thereof, to provide softness; treating agents containing methyl hydrogen polysiloxane, dimethyl polysiloxane with both ends blocked by hydroxyl groups, and catalysts for condensation reactions to provide long-lasting softness, antiwrinkling characteristics, and recovery characteristics; and treating agents containing methyl hydrogen polysiloxane, vinyl-substituted diorganopolysiloxane and catalysts for addition reactions.

Newer treating agents have also been proposed. For example, Japanese Patent Sho No. 48[1973]-17514 proposed a treating agent consisting of an organopolysiloxane having at least two epoxy groups per molecule plus an organopolysiloxane containing amino groups for smoothing synthetic organic fibers. Japanese Patent Sho No. 53[1978]-36079 proposed a treating agent consisting of a diorganopolysiloxane with both ends blocked by hydroxyl groups, amino- and alkoxy-containing organosilanes and/or their partially hydrolyzed products and condensation products. Japanese Patent Sho No. 53[1978]-19715 and Japanese Patent Sho No. 53[1978]-19716 proposed treating agents consisting of aminoalkyltrialkoxysilanes and epoxy-substituted organopolysiloxanes. Japanese Patent Sho No. 53[1978]-98499 proposed a treating agent containing a diorganopolysiloxane having more than two aminoalkyl groups and blocked by trioganosiloxy groups on both ends.

These conventional treating agents have certain disadvantages. For example, a treating agent having dimethyl polysiloxane oil as the major ingredient possesses insufficient antiwrinkling characteristics and recovery characteristics. Another disadvantage is the lack of long-lasting softness and smoothness characteristics. In cases where treating agents containing alkoxysilanes as necessary components after emulsification are used, disadvantages are that the alkoxysilanes are readily hydrolyzed and the treatment baths have a short service life.

Treating agents with methyl hydrogen polysiloxane as a major component have the disadvantage that curing reactions are incomplete when no catalyst is used. When a catalyst is used, the life of the treating bath is shortened. Furthermore, they have the additional disadvantage of generating hazardous amounts of hydrogen gas which may lead to fires and explosions.

Treating agents with an epoxy-containing organopolysiloxane and an amino-containing organopolysiloxane as major components have disadvantages in that they generate a large amount of static electricity due to friction, oily stains adhere to them easily, and they exhibit reduced moisture and perspiration absorption when used for treating underwear. In order to improve these compositions, a sulfuric acid ester of ricinoleic acid, sulfate oil, a polysiloxane-polyoxyalkylene copolymer, polyoxyethylene addition products of higher alcohols, and other hydrophilic surfactants are added to these treating agents. However, these surfactants dissolve readily in water or organic solvents used in dry cleaning. With repeated washings, they can be removed easily and do not last long.

As a result of intensive investigations by the present inventors, the disadvantages of the conventional fiber treating agents have been eliminated. The present invention provides fiber treating agents which can give fiber materials long-lasting electrostatic prevention characteristics, moisture and perspiration absorptivity, antisoiling characteristics, softness, smoothness, antiwrinkling characteristics and compression recovery characteristics.

BRIEF SUMMARY OF THE INVENTION

The present invention relates to a composition for treating fibers, said composition comprising a carrier liquid, an organopolysiloxane component having the formula

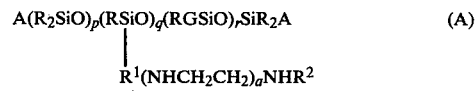

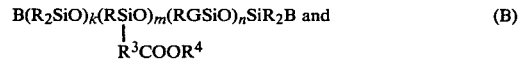

and one other organopolysiloxane component selected from the group consisting of

$$D(R_2SiO)_x(RESiO)_y(RGSiO)_zSiR_2D, \quad (C)$$

wherein, at each occurrence, A denotes R or G or $R^1(NHCH_2CH_2)_aNHR^2$, B denotes R or $R^3COOR^4$ or G, D denotes R or E or G, E denotes

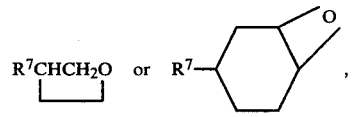

G denotes $R^5{}_bO(C_2H_4O)_c(C_3H_6O)_dR^6$, R denotes a substituted or unsubstituted monovalent hydrocarbon group, $R^1$ denotes a divalent hydrocarbon group, $R^2$ denotes a hydrogen atom or a monovalent hydrocarbon group, $R^3$ denotes a divalent hydrocarbon group, $R^4$ denotes a hydrogen atom or a monovalent hydrocarbon group, $R^5$ denotes a divalent organic group, $R^6$ denotes a hydrogen atom or a monovalent organic group, $R^7$ denotes a divalent organic group, a has a value of from 0 to 10, b has a value of 0 or 1, c has a value of from 0 to 50, d has a value of from 0 to 50 c+d has a value of from 2 to 100, k has a value of from 0 to 500, m has a value of from 0 to 100, n has a value of from 0 to 100, k+m+n has a value of from 10 to 500, p has a value of from 0 to 500, q has a value of from 0 to 100, r has a value of from 0 to 100, $p+q+r$ has a value of from 10 to 500, x has a value of from 0 to 500, y has a value of from 0 to 100, z has a value of from 0 to 100 and $x+y+z$ has a value of from 10 to 500, there being at least two $R^1(NHCH_2CH_2)_aNHR^2$ groups and at least one G group per molecule of component (A), at least two $R^3COOR^4$ groups and at least one G group per molecule of component (B) and at least two E groups and at least one G group per molecule of component (C).

In other words, the fiber treating agents of the present invention contain organopolysiloxanes obtained by combining (A) with (B) or (A) with (C) as major ingredients. Each of the organopolysiloxanes (A), (B) and (C) used alone can only provide fiber materials with short-lived electrostatic prevention characteristics, moisture and perspiration absorptivity, antisoiling characteristics, softness, smoothness, antiwrinkling characteristics, and compression recovery characteristics. However, if the two types of organopolysiloxanes (A) and (B) or (A) and (C) are combined, bridging reactions between amino groups and carboxyl groups or between amino groups and epoxy groups can be produced by simple heat treatment. As a consequence, the effects mentioned above are improved. In addition, these effects can be longlasting. This means that they can survive water washing or dry cleaning and can be maintained for a long time.

DETAILED DESCRIPTION OF THE INVENTION

Organopolysiloxane component (A) is represented by the above general formula. In the formula, R is a substituted or unsubstituted monovalent hydrocarbon group, such as a methyl group, ethyl group, propyl group, dodecyl group, vinyl group, phenyl group, -phenylethyl group, or 3,3,3-tri-fluoropropyl group. It is possible, but not necessary, for all R's to be identical. Although R is most commonly a methyl group, the combination of methyl groups with other R groups is also suitable.

In the $-R^1+NHCH_2CH_2\rightarrow_aNHR^2$ group, $R^1$ is a divalent hydrocarbon group such as $-CH_2-$, $-CH_2CH_2-$, $-CH_2CH_2CH_2-$, $-CH_2CH(CH_3)-$ $C_2-$, $+CH_2+_4$, or other alkylene groups, or $+CH_2+_2C_6H_4-$ or other arylalkylene groups. The propylene group is most common. $R^2$ is hydrogen or a monovalent hydrocarbon group. Examples of the latter are methyl groups, ethyl groups, propyl groups, hexyl groups, and phenyl groups. The value of a is from 0 to 10. G is a group represented by $+R^5+_bO+C_2H_4O+_c+C_3H_6O+_dR^6$. $R^5$ is a divalent organic group, such as an alkylene group with 1 to 5 carbon atoms, a $-C_6H_4-$ group, a $-CO-$ group, or a $-NHCO-$ group connected with alkylene groups bonded with silicon atoms. $R^6$ is hydrogen or a monovalent organic group. Examples of these $R^6$ organic groups are methyl groups, ethyl groups, propyl groups, dodecyl groups, cyclohexyl groups, phenyl groups, -phenylethyl groups or other monovalent hydrocarbon groups, acyl groups, or carbamyl groups. The value of b is 0 or 1. The value of c and d are each from 0 to 50, but $c+d$ has a value of from 2 to 100. A is selected from R, $-R^1+NHCH_2CH_2\rightarrow_aNHR^2$ or G. The value of p is 0 to 500, and q and r each have a value of from 0 to 100, with $p+q+r$ equal to 10 to 500.

The amino groups of component (A) undergo bridging reactions with the carboxyl groups or carboxylic acid ester groups of component (B) or with the epoxy groups of component (C), thus providing fiber materials treated therewith with long-lasting electrostatic prevention characteristics, moisture and perspiration absorptivity, antisoiling characteristics, softness, smoothness, antiwrinkling characteristics, and compression recovery characteristics. Therefore, it is necessary to have an average of at least two $-R^1+NHCH_2CH_2\rightarrow_aNHR^2$ groups in each of the molecules of component (A). Similarly, in order to give fiber materials electrostatic prevention characteristics, moisture and perspiration absorptivity and antisoiling characteristics, it is necessary to have an average of at least one polyoxyalkylene group having the formula G in each of the molecules of component (A). These $-R^1+NHCH_2CH_2\rightarrow_aNHR^2$ groups and polyoxyalkylene groups may exist as terminal and/or as pendant groups in the molecular structure of the organopolysiloxanes. If the value of $c+d$ for the polyoxyalkylene group is too low, water solubility and self-emulsifying characteristics of the component will be poor and the electrostatic prevention characteristics, moisture absorptivity, perspiration characteristics, and antisoiling characteristics will exhibit decreased effectiveness. On the other hand, if the value of $c+d$ is too high, the polyoxyalkylene groups are prone to the formation of branches during production. Preferably $c+d$ has a value of from 5 to 50. The preferred ranges for the siloxane units are $p=10$ to 500, $q=2$ to 20, and $r=2$ to 30, with $p+q+r$ equal to 10 to 500. If this value of $p+q+r$ is below 10, the enhancement of softness and smoothness in the fiber materials will be lacking; if it exceeds 500, emulsification becomes difficult. Component (A) can be produced according to a method described in U.S. Pat. No. 4,247,592, which is hereby incorporated by reference.

Component (B) of the organopolysiloxanes is represented by a general formula given above. In this formula, R is a substituted or unsubstituted monovalent hydrocarbon group. The same examples as those previously given for R are hereby cited. It is possible, but not necessary, for all R's in a molecule of B to be identical. R is most commonly a methyl group; however, it is also common to have methyl groups in combination with other R groups. In $-R^3-COOR^4$, the group $R^3$ is a divalent hydrocarbon group. The same examples as those previously given for $R^1$ can be cited as examples of $R^3$ groups; such as $-CH_2-$, $-CH_2CH_2-$, $-CH_2CH_2CH_2-$, $-CH_2CH(CH_3)CH_2-$, $+CH_2+_4$, or other alkylene groups and $+CH_2+_2C_6H_4-$ or other arylalkylene groups. $R^4$ is hydrogen or a monovalent hydrocarbon group. The same examples as those cited for $R^2$ can be given as examples of $R^4$ groups; such as methyl groups, ethyl groups, propyl groups, hexyl groups, phenyl groups and other monovalent hydrocarbon groups. G is a polyoxyalkylene group represented by the formula $+R^5+_bO+C_2H_4O+_c+C_3H_6O+_dR^6$ in which $R^5$, $R^6$, b, c, d and $c+d$ are the same as before. B is a groups selected from R, $-R^3-COOR^4$ or G as described above. The value of k is from 0 to 500, and the values of m and n are each from 0 to 100, with $k+m+n$ equal to from 10 to 500. The preferred ranges of the polyoxyalkylene units and the siloxane units are the same as those for component (A) for identical reasons.

The carboxylic acid groups or carboxylic acid ester groups of component (B) undergo bridging reactions with the amino groups of component (A) to provide the fiber materials treated therewith with the various long-lasting properties mentioned previously. It is thus necessary to have an average of at least two $-R^3-COOR^4$ groups in each of the molecules of component (B). Similarly, in order to provide the fiber materials with electrostatic prevention characteristics, moisture and perspiration absorptivity and antisoiling characteristics, it is necessary to have an average of at least one polyoxyalkylene group having the formula G in each of the component (B) molecules. These —R$^3$—COOR$^4$ groups and these polyoxyalkylene groups can be present as terminal and/or as pendant groups in the molecular structure of the organopolysiloxane. Component (B) can be produced by the addition reaction described in U.S. Pat. No. 2,970,150, which is incorporated herein by reference.

Organopolysiloxane component (C) is represented by the general formula given above. In this formula, R is a substituted or unsubstituted monovalent hydrocarbon group which is exemplified by same examples given for R in the explanation of component (A).

The epoxy-containing monovalent organic group indicated by E is represented by the general formulae

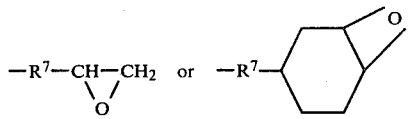

where R$^7$ is a divalent organic group, such as a methylene group, ethylene group, propylene group, phenylene group, hydroxylated hydrocarbon group, chloroethylene group, fluoroethylene group,

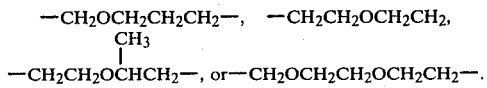

The polyoxyalkylene group represented by G is the same as that described before in the explanation of component (A). D is a group selected from R, E or G. The value of x is from 0 to 500, and the values of y and z are each from 0 to 100, with x+y+z is equal to from 100 to 500. The preferred ranges of the polyoxyalkylene units and the siloxane units for component (C) are the same as those for the case of component (A).

Each of the molecules of component (C) should have an average of at least two epoxy-containing organic groups and an average of at least one polyoxyalkylene group, for the same reasons explained in the cases of component (A) and component (B). These epoxy-containing organic groups and polyoxyalkylene groups can be present as terminal and/or pendant groups in the molecular structures of the organopolysiloxanes. Component (C), like component (B), can be produced by using an addition reaction described in U.S. Pat. No. 2,970,150, for example.

The relative amounts of the two organopolysiloxane components to be used in the compositions of this invention are not narrowly critical; however, an optimum amount of fiber-treating compositions will be durably fixed to fibers treated therewith if the two organopolysiloxane components are present in substantially equivalent amounts. By substantially equivalent amounts it is meant that the total number of organofunctional radicals (amino, carboxy or epoxy) in one organopolysiloxane component is equal to about 90 to 110% of the total number of organofunctional radicals (amino, carboxy or epoxy) in the other component.

Two organopolysiloxanes, i.e., component (A) and component (B) or component (A) and component (C), are dissolved in carrier liquid such as an organic solvent or water to prepare treating solutions. Examples of such organic solvents are toluene, xylene, benzene, n-hexane, heptane, acetone, methyl ethyl ketone, methyl isobutyl ketone, ethyl acetate, butyl acetate, mineral turpentine, perchloroethylene, etc. The treating solutions can be applied to the fiber materials with sprays, rollers, by soaking, etc. They can also be self-emulsified or emulsified with suitable emulsifiers and then applied to the fiber materials with sprays, rollers, by soaking, etc. Examples of such emulsifiers are sulfuric acid esters of higher alcohols, alkyl benzenesulfonic acid salts, higher alcohol-polyoxyalkylene addition products, alkyl phenol-polyoxyalkylene addition products, and higher fatty acid sorbitan esters.

The two organopolysiloxane components may be dissolved separately and emulsified, then mixed and applied to fiber materials. Alternatively, a solution or emulsion of either component can be applied to the fiber material, followed by a solution or an emulsion of the other component. In essence, any treating method can be used as long as the two organopolysiloxane components coexist on the fiber material. From the point of view of treatment homogeneity, it is preferable to premix the two organopolysiloxane components to yield a treating agent which is used on fiber materials. The total amount of the two organopolysiloxane components applied is generally from 0.1 to 4 wt%, based on the fiber materials. By evaporation at ambient temperature, forced hot air, heat treatment or the like, the carrier liquid is removed from the applied composition. With subsequent heat treatment, a fast bridging reaction occurs between the two orgaopolysiloxanes. Long-lasting electrostatic prevention characteristics, moisture and perspiration absorptivity, antisoiling characteristics (especially with respect to oils), softness, smoothness, antiwrinkling characteristics, and compression recovery characteristics are observed. Forced hot air or heat treatment is more preferable than evaporation at ambient temperature because it enhances operating efficiency and the long-lasting nature of the characteristics. If desired, a suitable curing catalyst may be added. It is also permissible to combine one or more conventional additives such as electrostatic preventing agents, softeners, antiwrinkling agents, heat-resistant agents, and fire retardants.

The treating agents of this invention can be used to treat a variety of fiber materials. From the point of view of materials, examples are wool, silk, hemp, wood fiber, asbestos, or other natural fibers; rayon, acetates, or other regenerated fibers; polyesters, polyamides, vinylon, polyacrylonitrile, polyethylene, polypropylene, spandex, or other synthetic fibers; glass fibers; carbon fibers; and silicon carbide fibers. Their shapes can be staples, filaments, threads, textiles, woven products, non-woven fibers, resin-processed fabrics, etc. However, it is more efficient to use textiles, woven products, non-woven fibers, bedding cotton, and the like in sheet form for continuous treatment.

In the following, examples and comparative examples are given to further teach how to make and use the present invention. In these examples and comparative examples, parts and % all refer to parts by weight and wt%. Viscosities are the values at 25° C. Me denotes the methyl radical.

EXAMPLE 1

A treating solution was prepared by dissolving 0.75 part of an amino-substituted organopolysiloxane represented by formula (1):

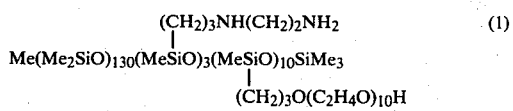

with a viscosity of 4000 centistokes, and 0.75 part of an organopolysiloxane represented by formula (2):

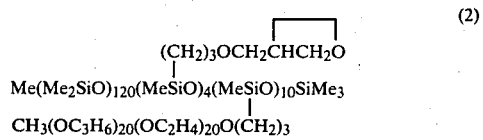

with a viscosity of 3500 centistokes, in 98.5 parts of water.

Plain polyester/cotton fabric (65/35) was soaked in this treating solution and removed. It was then pressed between mangle rollers so that the amount of organopolysiloxanes adhering to the fabric was 1.5%. The fabric was dried at 110° C. for 7 minutes and heat-treated at 170° C. for 5 minutes to complete the organopolysiloxane bridging reaction.

For comparative examples, two treating solutions were prepared. One of the solutions was prepared from 1.5 part of an organopolysiloxane represented by formula (1) containing amino groups and polyoxyalkylene groups, mixed with 98.5 parts water. The other solution was prepared from 1.5 part organopolysiloxane represented by formula (2) and containing organic epoxy groups and polyoxyalkylene groups, mixed with 98.5 parts water. Pieces of cloth were treated with these comparison treating solutions under the same conditions as above.

Various tests were performed on the treated pieces of cloth to determine their electrostatic prevention characteristics, moisture absorptivity, and antisoiling characteristics. These tests are shown in the following.

To investigate electrostatic prevention characteristics, each of the treated and untreated pieces of cloth were first soaked in perchloroethylene. After stirring for 15 minutes, they were dried to mimic the dry cleaning process. This operation was repeated twice. They were cleaned for 15 minutes with an aqueous solution of 0.5% Maruseru soap in an automatic, reverse rotating, eddy-type electric washer under heavy-duty conditions. They were then washed with water. This operation was repeated twice. The untreated and treated cloth after cleaning, and the untreated and treated cloth without cleaning were kept for one week at 20° C. and a humidity of 65%. By using a rotary static tester of the Tokyo University Chemistry Research type, a cotton cloth (Kanakin No. 3) was used on a friction-test cloth for measuring the friction voltage (V) after rotation at 800 revolutions per minute for 60 seconds. A fluorescence X-ray apparatus (made by the Rikagaku Denki Kogyo Sha) was used to determine the residual organopolysiloxane content (%) of the treated cloth after cleaning.

To investigate antisoiling characteristics with respect to oils, 300 g ASTM-No. 1 oil, 3 g coal tar, 5 g dry clay powder, 5 g portland cement, and 5 g sodium dodecyl benzene sulfonate were thoroughly ground and mixed in a crucible to prepare an artificial dirt mixture. This dirt mixture (5 ml) and a 0.5% aqueous Maruseru soap solution (100 ml) were placed into 450-ml glass bottles. 5×10 cm pieces of treated and untreated cloth were placed individually in the glass bottles. Ten steel balls were added to each bottle to help soak the test cloth with the artificial dirt solution. The test pieces were treated at 60° C. for 30 minutes. After being rinsed with water and dried, they were washed with an aqueous 0.5% Maruseru soap solution in an automatic, reverse rotating, eddy-type electric washer under heavy-duty conditions for 10 minutes. The reflectivity (%) of the test cloth after washing with water and drying was measured by a reflectometer at a wavelength of 550 m.

The measured results of these tests are shown in Table I. As shown from these measured values, the cloth treated with the treating solution of the present invention performed better than those in the comparative examples, particularly with regard to electrostatic prevention characteristics and antisoiling characteristics after washing.

TABLE 1

| | Cloth Treatment | | | |
|---|---|---|---|---|
| Test Items | This Invention | Untreated | Formula (1) Only | Formula (2) Only |
| Frictional electrostatic voltage | | | | |
| Before washing (V) | 970 | 1880 | 940 | 950 |
| After washing (V) | 1150 | 1830 | 1750 | 1660 |
| Organopolysiloxane remaining (%) | 56 | | 24 | 19 |
| Reflectivity at 550 m (%) | 73 | 50 | 55 | 58 |

EXAMPLE 2

A treating solution was prepared by dissolving 1 part of an organopolysiloxane represented by formula (3), which had a viscosity of 8500 centistokes, and contained carboxyl groups and polyoxyalkylene groups, and 0.5 part of the organopolysiloxane used in Example 1 represented by formula (1) which contained amino groups and polyoxyalkylene groups, in 98.5 parts of water.

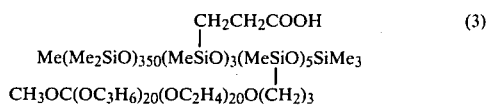

A knitwear of 100% cotton was soaked in this treating solution. It was centrifuged to remove the solution; 1.5% of the organopolysiloxane adhered to the fabric. It was dried at room temperature for 24 hours, then heat-treated at 120° C. for 5 minutes.

As comparative examples, two treating solutions were prepared. One of the treating solutions was prepared from 1.5 part of an organopolysiloxane represented by formula (1), containing amino groups and polyoxyalkylene groups, and 98.5 parts of water. The other treating solution was prepared from 1.5 part of an organopolysiloxane represented by formula (3), containing carboxyl groups and polyoxyalkylene groups, and 98.5 parts of water. Knitwears of 100% cotton were treated under the same conditions as described previously.

The treated and untreated cloth pieces were cleaned for 15 minutes in a 0.5% aqueous Maruseru soap solution in an automatic, reverse rotating, eddy-type electric washer under heavy-duty conditions, then rinsed with water and dried. This operation was repeated five times.

Tests were performed on treated and untreated cloth after cleaning and on treated and untreated cloth without cleaning to measure the percentage of organopolysiloxane remaining and the reflectivity at 550 m as in Example 1. The qualities of the treated and untreated cloth after cleaning were investigated by touch. These results are shown in Table II. It is clear that the cloth treated with the treating agent of the present invention was the best in antisoiling characteristics and quality.

TABLE II

| Test Items | Treated Cloth | | | |
|---|---|---|---|---|
| | This Invention | Untreated | Formula (1) Only | Formula (3) Only |
| Organopolysiloxane remaining (%) | 51 | 0 | 20 | 87 |
| Reflectivity at 550 m (%) | 69 | 51 | 58 | 55 |
| Qualities after washing | Extremely good in both softness and stretchability | Very poor in both softness and stretchability | Somewhat good in both softness and stretchability | Good softness but somewhat poor in stretchability |

That which is claimed is:

1. A cmposition for treating fibers, said composition comprising a carrier liquid, an organopolysiloxane component having the formula $$A(R_2SiO)_p(RSiO)_q(RGSiO)_rSiR_2A,\quad (A)$$
$$|$$
$$R^1(NHCH_2CH_2)_aNHR^2$$

and one other organopolysiloxane component selected from the group consisting of $$B(R_2SiO)_k(RSiO)_m(RGSiO)_nSiR_2B \text{ and} \quad (B)$$
$$|$$
$$R^3COOR^4$$

$$D(R_2SiO)_x(RESiO)_y(RGSiO)_zSiR_2D \quad (C)$$

wherein, at each occurrence,
A denotes R or $R^1(NHCH_2CH_2)_aNHR^2$ or G,
B denotes R or $R^3COOR^4$ or G,
D denotes R or E or G,
E denotes

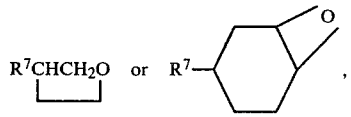

G denotes $R^5_bO(C_2H_4O)_c(C_3H_6O)_dR^6$,
R denotes a substituted or unsubstituted monovalent hydrocarbon group,
$R^1$ denotes a divalent hydrocarbon group,
$R^2$ denotes a hydrogen atom or a monovalent hydrocarbon group,
$R^3$ denotes a divalent hydrocarbon group,
$R^4$ denotes a hydrogen atom or a monovalent hydrocarbon group,
$R^5$ denotes a divalent organic group,
$R^6$ denotes a hydrogen atom or a monovalent organic group,
$R^7$ denotes a divalent organic group,
a has a value of from 0 to 10,
b has a value of 0 or 1,
c has a value of from 0 to 50,
d has a value of from 0 to 50,
c+d has a value of from 2 to 100,
k has a value of from 0 to 500,
m has a value of from 0 to 100,
n has a value of from 0 to 100,
k+m+n has a value of from 10 to 500,
p has a value of from 0 to 500,
q has a value of from 0 to 100,
r has a value of from 0 to 100,
p+q+r has a value of from 10 to 500,
x has a value of from 0 to 500,
y has a value of from 0 to 100,
z has a value of from 0 to 100 and
x+y+z has a value of from 10 to 500,
there being at least two $R^1$ $(NHCH_2CH_2)_aNHR^2$ groups and at least one G group per molecule of component (A), at least two $R^3COOR^4$ groups and at least one G group per molecule of component (B) and at least two E groups and at least one G group per molecule of component (C).

2. A composition according to claim 1 wherein component (A) has the formula

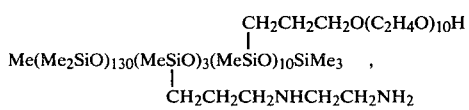

component (B) has the formula and component (C) has the formula

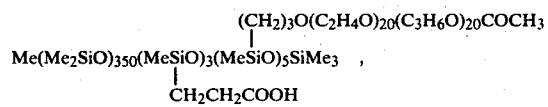

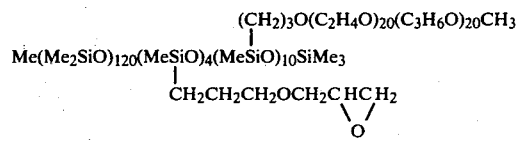

wherein Me denotes the methyl radical.

3. A composition according to claim 2 wherein the two organopolysiloxane components are component (A) and component (B).

4. A composition according to claim 2 wherein the two organopolysiloxane components are component (A) and component (C).

5. A composition according to claims 1, 2, 3 or 4 wherein the two organopolysiloxane components are present in substantially equivalent amounts.

* * * * *

UNITED STATES PATENT AND TRADEMARK OFFICE
CERTIFICATE OF CORRECTION

PATENT NO. : 4,359,545
DATED : November 16, 1982
INVENTOR(S) : Isao Ona, Masaru Ozaki, Yoichiro Taki It is certified that error appears in the above-identified patent and that said Letters Patent is hereby corrected as shown below:

In column 3, line 44, "$C_2-,$" should read -- $CH_2-,$ --.

In column 9, line 49, "cmposition" should read --composition--.

In column 10, line 54, "$(NHCH_2CH_2)_a$" should read --$(NHCH_2CH_2)_a$--.

Signed and Sealed this

First Day of January 1985

[SEAL]

Attest:

GERALD J. MOSSINGHOFF

Attesting Officer

Commissioner of Patents and Trademarks